United States Patent [19]

Neshat et al.

[11] Patent Number: 5,480,590
[45] Date of Patent: Jan. 2, 1996

[54] AERATOR

[75] Inventors: Amir M. Neshat, Jonesboro; William G. Badley, Pocahontas; Marnie L. Johnson, Saffell; Barry L. Woodard, Black Rock; James D. Gearhart, Jonesboro, all of Ark.

[73] Assignee: The Scott Fetzer Company, Westlake, Ohio

[21] Appl. No.: 287,667

[22] Filed: Aug. 9, 1994

[51] Int. Cl.[6] .................................................. B01D 47/02
[52] U.S. Cl. ........................ 261/30; 119/263; 210/169; 261/121.3; 417/411
[58] Field of Search .................................. 261/30, 121.1, 261/121.2; 210/169; 119/263; 417/234

[56]         References Cited

U.S. PATENT DOCUMENTS

| 2,552,261 | 8/1951 | Coughlin . | |
| 2,808,196 | 10/1957 | Williams | 261/121.2 |
| 2,919,120 | 12/1959 | Baxter . | |
| 2,960,321 | 11/1960 | Stoots, Jr. . | |
| 3,189,334 | 6/1965 | Bell . | |
| 3,216,650 | 11/1965 | Thyreen . | |
| 3,309,067 | 3/1967 | Brewster | 261/121.2 |
| 3,374,990 | 3/1968 | Gray . | |
| 3,910,725 | 10/1975 | Rule | 417/411 |
| 4,389,166 | 6/1983 | Harvey et al. | 417/234 |
| 4,627,797 | 12/1986 | Rill, Jr. . | |
| 4,789,307 | 12/1988 | Sloan | 417/411 |
| 5,231,789 | 8/1993 | Radmanovich . | |
| 5,290,350 | 3/1995 | Besnard | 106/214 |
| 5,346,541 | 9/1995 | Goldman | 106/163.1 |

FOREIGN PATENT DOCUMENTS 82-03254  9/1982  WIPO .................................. 417/411

*Primary Examiner*—Khanh P. Nguyen
*Attorney, Agent, or Firm*—Watts, Hoffmann, Fisher & Heinke

[57] ABSTRACT

An aerator for attachment to a container for live fish. The aerator includes a one-piece molded plastic housing. The housing includes a lid portion, a body portion and a hinge portion pivotally connecting together the lid portion and the body portion. The body portion has a space for an operating battery and a storage space for a space battery. A first latch portion is attached to a body portion. An attachment device is molded into the lid portion of the housing. The attachment device defines a second latch portion which cooperates with the first latch portion to releasably secure the lid portion in a closed position relative to the body portion. The aerator includes a pump and a motor operably connected to the pump. The pump and motor are attached to the lid portion of the housing and electrical connection with the working battery is completed when the lid portion is pivoted to the closed position relative to the body portion.

18 Claims, 3 Drawing Sheets

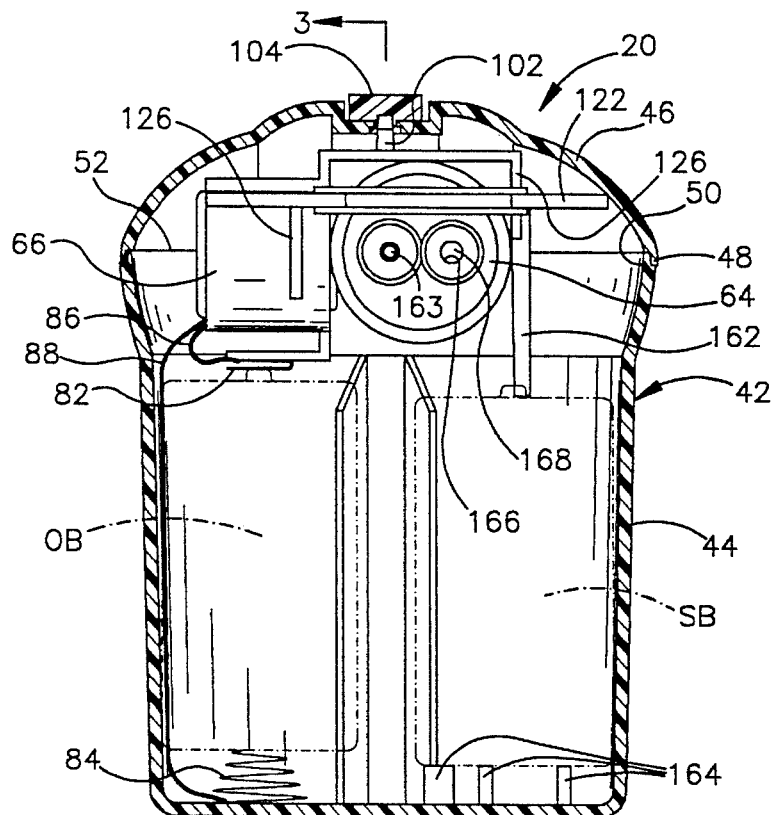
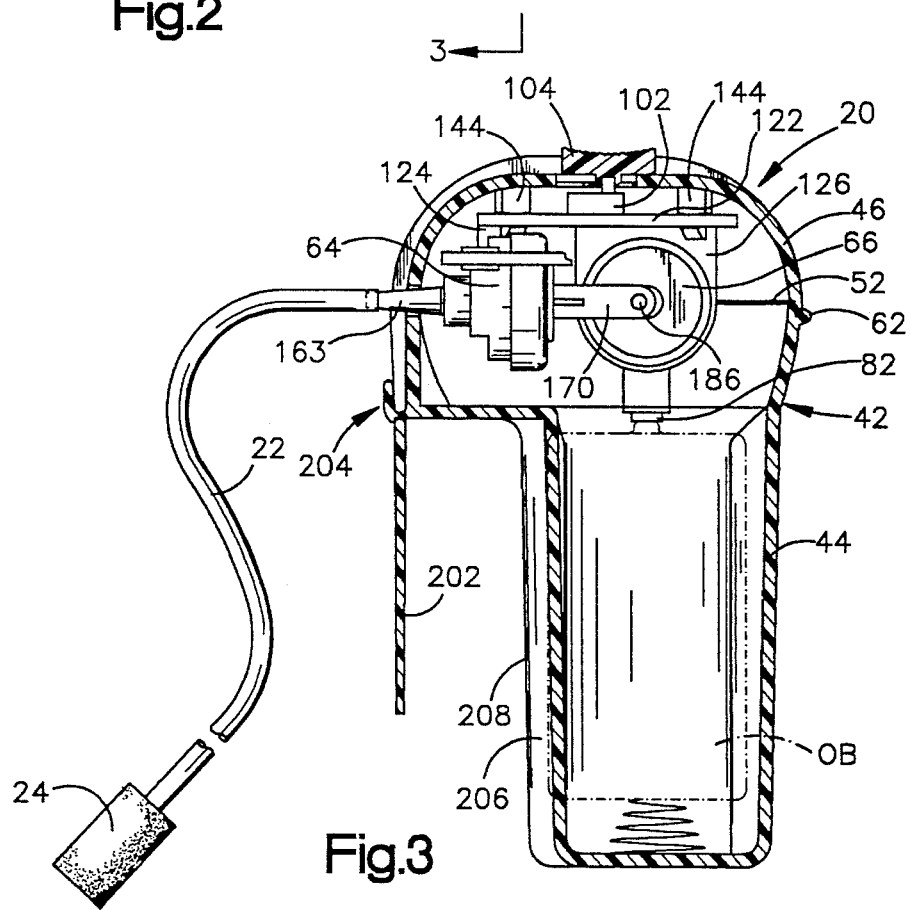
Fig.2
Fig.3

AERATOR

BACKGROUND OF THE INVENTION

1. Technical Field

The present invention relates generally to an aerator for introducing air into a liquid. In particular, the present invention relates to an aerator for use with a live fish container to replenish oxygen in water.

2. Description of the Prior Art

When live fish or live bait are placed in water in an enclosed container of sufficient size for transportation or temporary storage, the oxygen contained in the water is depleted in a relatively short time. The live fish or bait can become sluggish and possibly expire. These undesirable results can be prevented by introducing a supply of oxygen into the water.

Battery powered aerators for use with various types of live fish or live bait containers to introduce oxygen into the water are known. The known aerators include a housing for supporting a pump, a motor and one or more batteries. The known aerators typically include a hanger that is separately connectable to the housing for attaching the aerator to the container. However, the known aerators have certain drawbacks.

For example, U.S. Pat. No. 2,919,120, discloses an aerator including a multipiece housing into which water from the container or other sources can enter. A hose extends from a connector in an upper surface of the housing in a manner such that it is readily exposed and can be contacted which can cause damage. U.S. Pat. No. 3,216,650, discloses an aerator having a housing with at least two pieces engaging along a parting line that extends vertically and through which water can enter. Several screws are needed for fastening parts to the housing. A hose extends from a connector in an upper surface of the housing and can be contacted and damaged. U.S. Pat. No. 3,374,990, discloses an aerator with a multipiece housing that requires a relatively large amount of manipulation to attach a lid to a separate base.

SUMMARY OF THE INVENTION

The present invention is directed to an aerator that is easily assembled, has a one-piece splash-proof housing with a lid portion having an attachment device to mount the aerator and a latch mechanism to secure the lid portion to a body portion of the housing. The aerator is assembled without the use of tools or fasteners by snapping together individual parts and assemblies. Such ease of assembly provides a relatively low cost aerator in addition to the features described above.

The present invention is an aerator for attachment to a container for live fish. The aerator comprises a one-piece molded plastic housing. The housing includes a lid portion, a body portion and a hinge portion pivotally connecting the lid portion and the body portion. The body portion has space for an operating battery and storage space for a spare battery. A first latch portion is molded into the body portion and an attachment device is molded into the lid portion. The attachment device defines a second latch portion which cooperates with the first latch portion to releasably secure the lid portion in a closed position relative to the body portion. The attachment device comprises a hook for retaining the aerator on the container and for releasing the second latch portion from securing cooperating with the first latch portion.

The second latch portion is defined by an opening in the attachment device to receive the first latch portion. A hose connection is associated with an air pump in the housing. The hose connection extends through the opening defined by the second latch portion at a parting line between the lid portion and the body portion. The lid portion overlaps the body portion at the parting line to inhibit liquid splashed onto the lid portion from entering the body portion.

The aerator includes a pump and a motor operably connected to the pump. A frame supports the pump and the motor. The frame is attached to the lid portion by openings in the frame receiving support legs molded into the lid portion in a snapped-in relationship and without the use of fasteners. Electrical connection with the working battery is completed when the lid portion is pivoted to the closed relative to the body portion.

BRIEF DESCRIPTION OF THE DRAWINGS

Further features of the present invention will become apparent to those skilled in the art to which the present invention relates from reading the following specification with reference to the accompanying drawings, in which:

FIG. 2 is a front elevational view, partly in section, of the aerator of FIG. 1;

FIG. 3 is a side elevational view, partly in section, of the aerator of FIG. 2, taken approximately along line 3—3 in FIG. 2;

DESCRIPTION OF A PREFERRED EMBODIMENT

Figure 1:
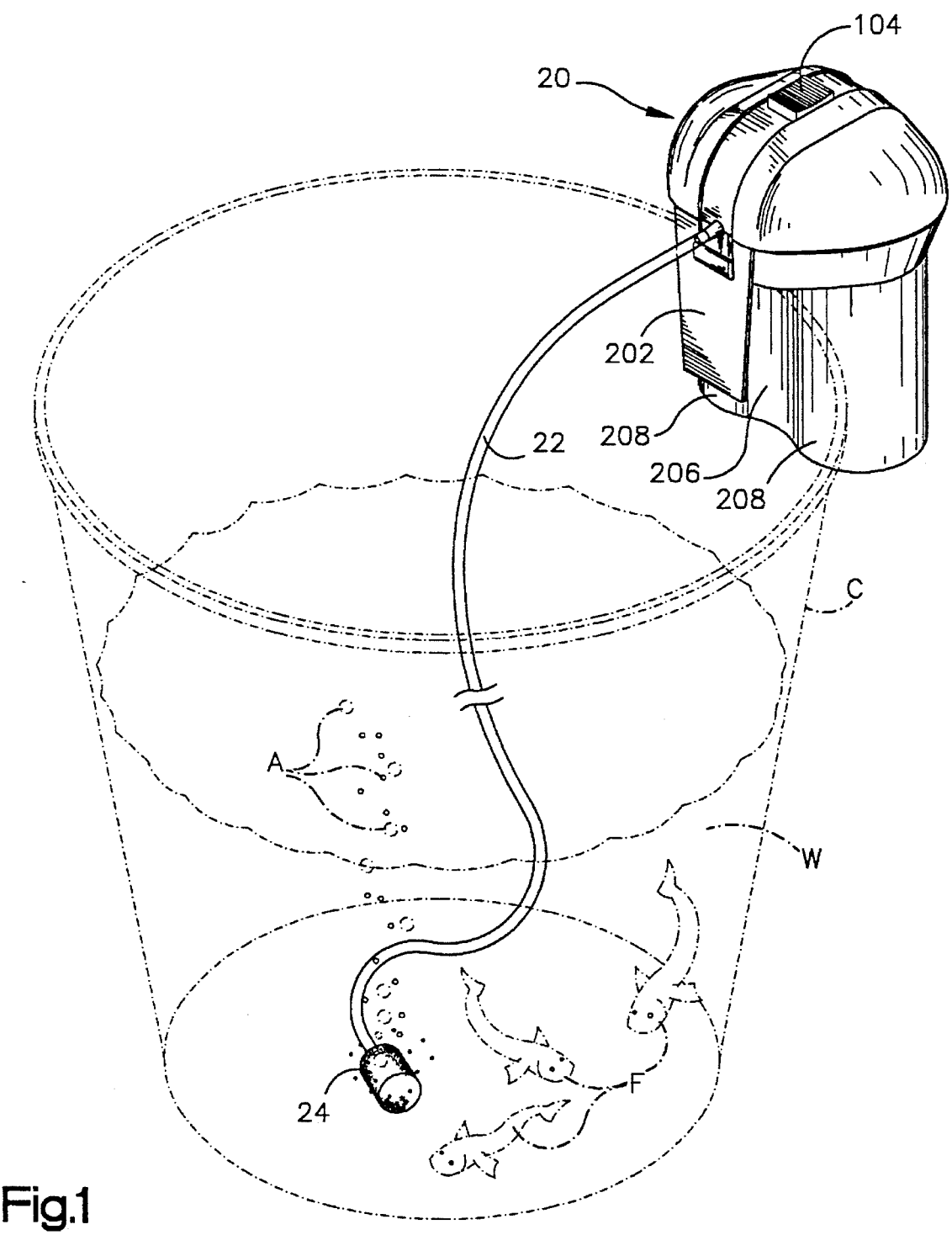
FIG. 1 is a perspective view of an aerator, embodying the invention, operably attached to a container for live fish.

An aerator 20 is illustrated in FIG. 1 for use with a container C, such as a bait bucket, live well or aquarium for live fish F. The aerator 20 is attachable to the container C and carries its own power supply in the form of a battery. The aerator 20 has a hose 22 operably connected at one end to the aerator and at another opposite end to a porous stone 24. Air under pressure from the aerator 20 is conducted through the hose 22 into the porous stone 24 to release air A into a liquid, such as water W, to replenish oxygen in the water and extend the vitality and lives of the fish F in the water.

The aerator 20 includes a housing 42 (FIGS. 2–4) for containing the operating parts and one or more batteries. The housing 42 includes a body portion 44 that is formed in a suitable size to house and support an operating battery OB and a spare batter SB. The housing 42 also includes a lid portion 46 for supporting and containing the operating components of the aerator 20.

The body portion 44 and lid portion 46 are integrally molded as one-piece from a homogenous plastic material. The lid portion 46 has a lip 48 formed on an outer periphery that extends around a lip 50 formed on an inner periphery of the body portion 44 at parting line 52. Thus, any water contacting the lid portion 46 is directed over lid portion 46 without entering into the body portion 44 to define a "splash-proof" feature of the aerator 20.

Figures 4, 5:
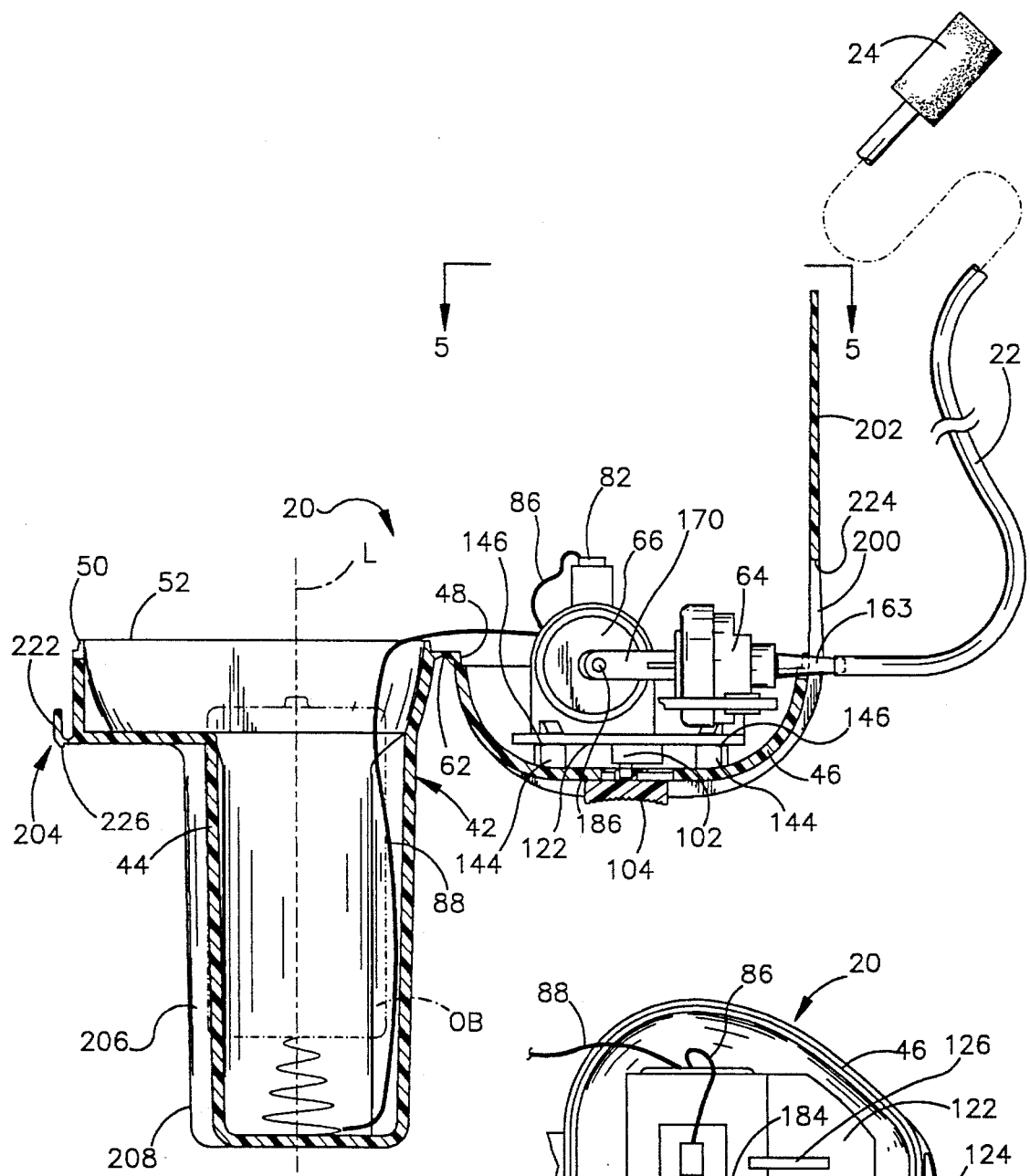
FIG. 4 is a cross-sectional view of the aerator, similar to FIG. 3, with parts in different positions.
FIG. 5 is a plan view of a lid portion, frame, pump and motor of the aerator, taken approximately along line 5—5 in FIG. 4.

A hinge 62 (FIGS. 3 and 4) pivotally interconnects the lid portion 46 with the body portion 44 of the housing 42. The hinge 62 is integrally molded with the housing 42 from the plastic material. Pivoting the lid portion 46 to an opened position relative to the body portion 44, as illustrated in FIG. 4, permits access to the batteries, OB, SB, as well as the operating components such as a pump 64 and a motor 66. Upon pivoting the lid portion 46 to a closed position relative to the body portion 44, as illustrated in FIG. 3, an electrical contact 82 is brought into engagement with one pole of the operating battery OB.

At the same time that the contact 82 is brought into engagement with the operating battery OB, a spring 84 in the bottom of the housing 42 engages another pole of the battery to complete electrical contact. The spring 84 is compressed and deflects an amount required by the contact 82 engaging the upper pole of the battery OB during movement of the lid portion 46 to the fully closed position relative to the body portion 44. The contact 82 and the spring 84 are connected by wires, 86, 88, respectively, with the motor 66 to provide electrical power when a switch 102 carried by the lid portion 46 is moved to the ON or energizing position.

A slidable button 104 is operably attached to a movable portion of the switch 102 to move the switch between ON and OFF positions, which selectively energizes or de-energizes the motor 66 by conducting electrical power from the operating battery OB. The button 104 is larger than an opening in the lid portion 46 so any water splashed on the button is directed away from the opening and does not enter the housing 42.

The pump 64 and motor 66 are supported in a frame 122. The frame 122 has retainers 124, 126 for receiving and supporting the pump 64 and the motor 66, respectively. The frame 122 has a plurality of openings 142 (FIG. 5), each of which receives a respective stand-off leg (FIGS. 3–5) projecting from the lid portion 46. During assembly of the aerator 20, the pump 64 and motor 66 are placed in the retention structure 124, 126, respectively of the frame 122. The frame 122 is then snapped into place by the openings 142 receiving deflectable end portions of the legs 144 until a frame stop surface 146 (FIG. 4) on a respective leg is reached. The deflectable end portions of the legs 144 have surfaces facing the stop surfaces 146 which block the frame 122 from moving in a direction away from the stop surface. Thus, a relatively easy to assembly aerator 20 is provided without requiring any tools or fasteners which could complicate the assembly process and increase cost.

The frame 122 also includes a projection 162 (FIG. 2) for engaging the upper part of the spare battery SB when the lid portion 46 is in the closed position relative to the body portion 44. The lower part of the spare battery SB is supported in the body portion 44 of the housing 42 by stand-off legs 163. Thus, the spare battery SB is held in place in the housing 42 and movement of the spare battery is inhibited. During operation of the aerator 20, for a relatively extended period of time, the operating battery OB may have its stored power depleted. The spare battery SB can then easily be exchanged for the depleted operating battery OB.

The pump 64 (FIG. 3) includes a diaphragm (not shown) to force air out of a hose connection 164 (FIGS. 2–5) during a power stroke. The hose 22 is received on the hose connection 164 for communicating air to the porous stone 24 located in the container C, as illustrated in FIG. 1. The pump 64 also includes an intake port 166 (FIG. 2) which allows air into a chamber on one side of the diaphragm during an intake stroke of the diaphragm. A flapper valve 168 pivots to the open position in the intake port 166 during an intake stroke to allow air into the pump chamber and closes during a power stroke so air does not exit then pump chamber from the port.

A piston and rod 170 (FIGS. 3–5) are connected at one end to the diaphragm located on a side opposite the pump chamber. The piston and rod 170 are connected at another end to a drive pin 186 of a crank 182. The crank 182 is connected to an output shaft 184 of the motor 66 to rotate a drive pin 186 eccentrically about the output shaft during rotation of the output shaft. Movement of the drive pin 186 in a direction away from the pump 64 causes an intake stroke of the diaphragm. Movement of the drive pin 186 towards the pump 64 causes a power stroke of the diaphragm.

The hose connection 164 extends from a side of the aerator 20 located closest to the container C when the aerator is properly attached to the container C. The hose connection 164 extends over the water W contained in the container C and is relatively closed to the water. Thus, a relatively short hose 22 is required to conduct air into the container C. The location of the hose connection 164 provides another advantage, such as protecting the hose 22 and the hose connection 164 from contact with objects and people that may be in a fishing boat when compared to prior known aerators in which the hose extends from the top of the aerator. Thus, there is less of a change of the hose 22 or hose connection 164 being damaged and is yet be able to perform their functions of communicating air to the water W.

The housing 42 provides a hook attachment device 202 for holding the aerator 20 on the container C. The housing 42 also includes a latch mechanism 204 which selectively maintains the lid portion 46 in engagement with the body portion 44 in the closed position or releases the lid portion from engagement with the body portion to allow relative pivotal movement to an open position. The attachment hook 202 defines an opening 200 through which the hose connection 164 extends when the latch mechanism 204 is in a latched position holding the lid portion 46 in engagement with the body portion 44 in the closed position. More specifically, the hose connection 164 extends through the opening 200 in the hook attachment hook 202 at the parting line 52 of the housing 42 between the lid portion 46 and a body portion 44.

The attachment hook 202 is integrally molded into the lid portion 46 and is spaced away from the body portion 44 by an amount sufficient to fit over container C that is used, such as an insulated cooler, aquarium, bucket and the like. A concave surface or recess 206 is formed in the body portion 44. The recess 206 is formed in a surface of the body portion 44 facing the attachment hook 202. The recess 206 serves to separate the batteries, OB,SB in the housing 42 and assures contact with the container C at two horizontally spaced apart locations 208 opposite the attachment hook 202. The two contact locations 208 are spaced apart a distance approximately equal to the width of the attachment hook 202. These contact locations 208 assure that the aerator 20 will not rock about its longitudinal central axis L by conforming around any round object to which it is attached, such as container C, illustrated in FIG. 1.

The latch mechanism 204 includes a first latch portion 222 integrally molded into the body portion 44. The attachment hook 202 also forms part of the latch mechanism 204. A second latch portion 224 is formed as part of the attachment hook 202. The second latch portion 224 is a surface, which at least partially defines the opening 200 in the attachment hook 202. The first latch portion 222 and the second latch portion 224 cooperate to releasably secure the lid portion 46 in the closed position relative to the body portion 44 when latched.

When the lid portion 46 is pivoted relative to the body portion 44, from the open position illustrated in FIG. 4 to the closed position illustrated in FIG. 3, the attachment hook 202 rides over the first latch portion 222 a predetermined distance and deflects inwardly towards the longitudinal central axis L to the latched condition. When the lid portion 46 is pivoted to or slightly past the fully closed position, as illustrated in FIG. 3, the attachment hook 202 is then free to snap inwardly towards the longitudinal central axis L so that the opening 200 completely surrounds the first latch portion 222. The second latch portion 224 is retained in the latched condition by a detent 226 of the first latch portion 222.

To pivot the lid portion 46 relative to the body portion 44 to the open position, as illustrated in FIG. 4, the attachment hook 202 is moved manually in a direction away from the longitudinal central axis L of the housing 42. This action moves the second latch portion 224 and its surface defining the opening 200 back past the detent 226 to an unlatched condition. The lid portion 46 is then free to pivot to the open position relative to the body portion 44. Thus, the attachment hook 202 forms part of the latch mechanism 204 and, in particular, as an opening lever.

From the above description of a preferred embodiment of the invention, those skilled in the art will perceive improvements, changes and modifications. Such improvements, changes and modifications within the skill of the art are intended to be covered by the appended claims.

Having described at least one preferred embodiment of the invention, what is claimed is:

1. An aerator for attachment to a container for live fish, said aerator comprising:
   a one-piece molded plastic housing, said housing including:
   a lid portion;
   a body portion having space for an operating battery and storage space for a spare battery;
   a hinge pivotally connecting together said lid portion and said body portion;
   a first latch portion on said body portion; and
   an attachment device formed integrally with said lid portion for holding the aerator onto a rim of a container, said attachment device defining a second latch portion that cooperates with said first latch portion to releasably secure said lid portion in a closed position relative to said body portion.

2. The aerator in claim 1 further including an air pump in said housing and a hose connection associated with the air pump, wherein said second latch portion of said attachment device defines an opening for receiving said first latch portion, and said hose connection extend through the opening.

3. The aerator of claim 2 wherein said hose connection extends through the opening at a parting line between said lid portion and said body portion.

4. The aerator in claim 3 wherein said lid portion overlaps said body portion at the parting line to inhibit liquid from entering an interior of said housing.

5. The aerator in claim 1 further including a concave surface of said body portion facing and spaced apart from said attachment device, wherein said body portion can contact the container at two spaced locations each extending along a side of the concave surface.

6. An aerator for attachment to a container for live fish, said aerator comprising:
   a one-piece molded plastic housing, said housing including:
   a lid portion;
   a body portion having space for an operating battery and storage space for a spare battery;
   a hinge pivotally connecting together said lid portion and said body portion;
   a first latch portion on said body portion; and
   an attachment device on said lid portion, said attachment device defining a second latch portion that cooperates with said first latch portion to releasably secure said lid portion in a closed position relative to said body portion,
   further including a pump and a motor operably connected to said pump, wherein said pump and said motor are supported by said lid portion, and electrical connection between said motor and the operating battery is completed when said lid portion is pivoted to the closed position relative to said body portion.

7. The aerator in claim 6 further including a frame for supporting said pump and said motor, wherein said frame is attached to said lid portion by openings in said frame receiving support legs molded into said lid portion.

8. The aerator in claim 6 further including a crank operably connecting said motor to said pump, said crank translating rotary motion of said motor to reciprocal motion of a plunger of said pump, said crank including a pin attached to and radially offset from an axis of rotation of a lever arm to establish a stroke of said plunger.

9. The aerator in claim 1 wherein said attachment device comprises a hook portion integrally formed with said lid portion for attaching said housing to the container and for releasing said second latch portion from cooperating with said first latch portion.

10. An aerator for attachment to a container for live fish, said aerator comprising:
    a one-piece molded plastic housing, said housing including a lid portion, a body portion and a hinge portion pivotally connecting said lid portion and said body portion, said body having space for an operating battery and storage space for a spare battery;
    a first latch portion attached to said body portion;
    an attachment device molded to said lid portion, said attachment device defining a second latch portion that cooperates with said first latch portion to releasably secure said lid portion in a closed position relative to said body portion;
    an air pump and a motor operably connected to said air pump, wherein said air pump and said motor are attached to said lid portion of said housing and electrical connection between the motor and the operating battery is completed when said lid portion is pivoted to the closed portion relative to said body portion; and
    a frame for supporting said air pump and said motor, said frame being attached to said lid portion.

11. The aerator in claim 10 further including a hose connection associated with said air pump, wherein said second latch portion of said attachment device defines an opening for receiving said first latch portion, and said hose connection extends through said opening.

12. The aerator in claim 11 wherein said hose connection extends through the opening at a parting line between said lid portion and said body portion.

13. The aerator in claim 12 wherein said lid portion includes a lip which overlaps said body portion at the parting line to inhibit liquid from entering an interior of said housing.

14. The aerator in claim 10 further including a concave surface of said body portion facing and spaced apart from said attachment device, wherein said body portion can contact the container at two spaced locations each extending along a side of the concave surface.

15. The aerator in claim 10 wherein said attachment device comprises a hook for attaching the housing to the container and for releasing said second latch portion from cooperation with said first latch portion.

16. An aerator for attachment to a container for live fish, said aerator comprising:

a housing including a lid portion, a body portion and a hinge portion pivotally connecting together said lid portion and said body portion, said body portion having space for an operating battery and storage space for a spare battery;

a first latch portion attached to said body portion;

an attachment device on said lid portion, said attachment device defining a second latch portion that cooperates with said first latch portion to releasably secure said lid portion in a closed position relative to said body portion; and a lip formed around the perimeter of said lid portion to overlap said body portion at a parting line between said lid portion and said body portion and inhibit liquid on said lid portion from entering said body portion when said lid portion is in the closed position relative to the body portion, further including a pump and a motor operably connected to said pump, wherein said pump and said motor are supported by said lid portion, and electrical connection between said motor and the operating battery is completed when said lid portion is pivoted to the closed position relative to said body portion.

17. The aerator in claim 16 further including a frame for supporting said pump and said motor, wherein said frame is attached to said lid portion by openings in said frame receiving at least a portion for respective support legs extending from said lid portion.

18. The aerator in claim 16 further including a concave surface of said body portion facing and spaced apart from said attachment device, wherein said body portion can contact the container at two spaced locations each extending along a side of the concave surface.

\* \* \* \* \*